Figure 1:
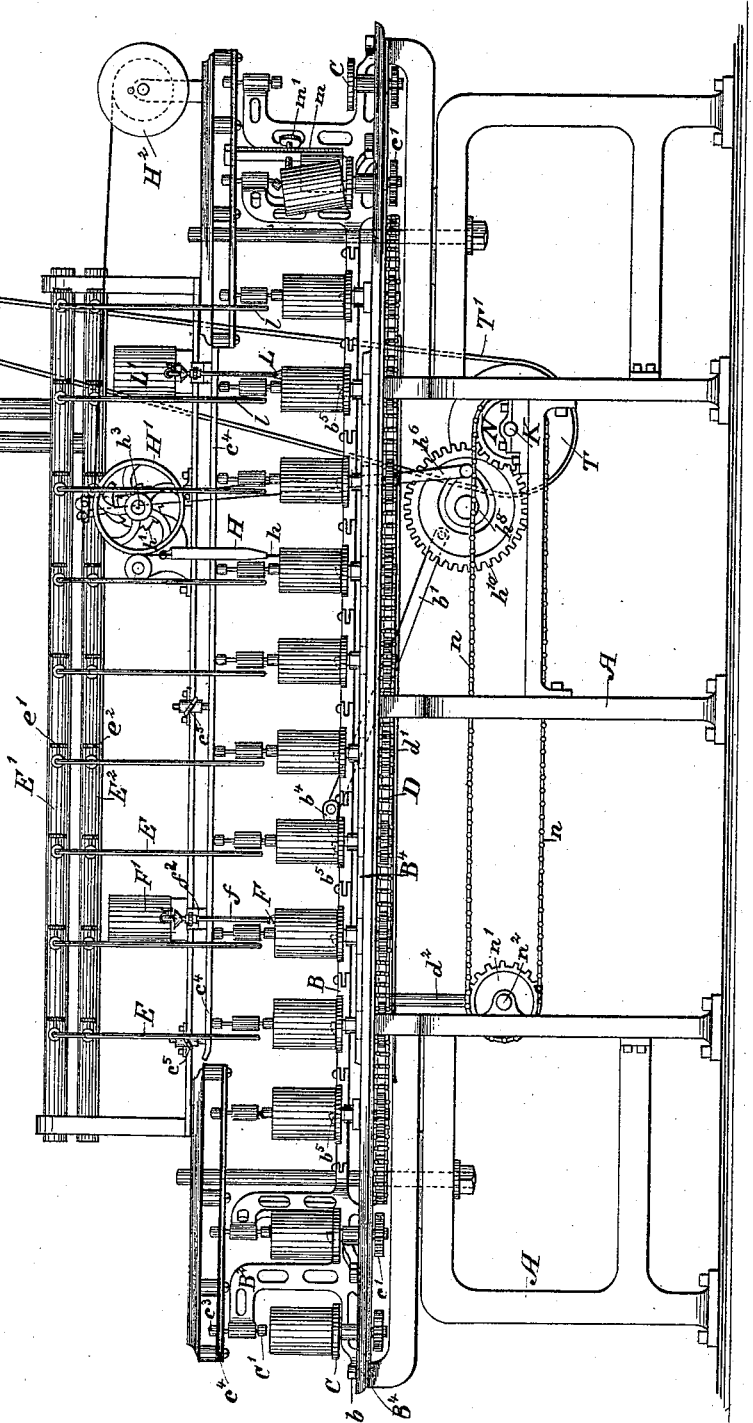

(No Model.) 3 Sheets—Sheet 1.

E. NORTON & J. G. HODGSON.
MACHINE FOR SOLDERING CAPS UPON SHEET METAL CANS.

No. 340,148. Patented Apr. 20, 1886.

Witnesses: Inventors:

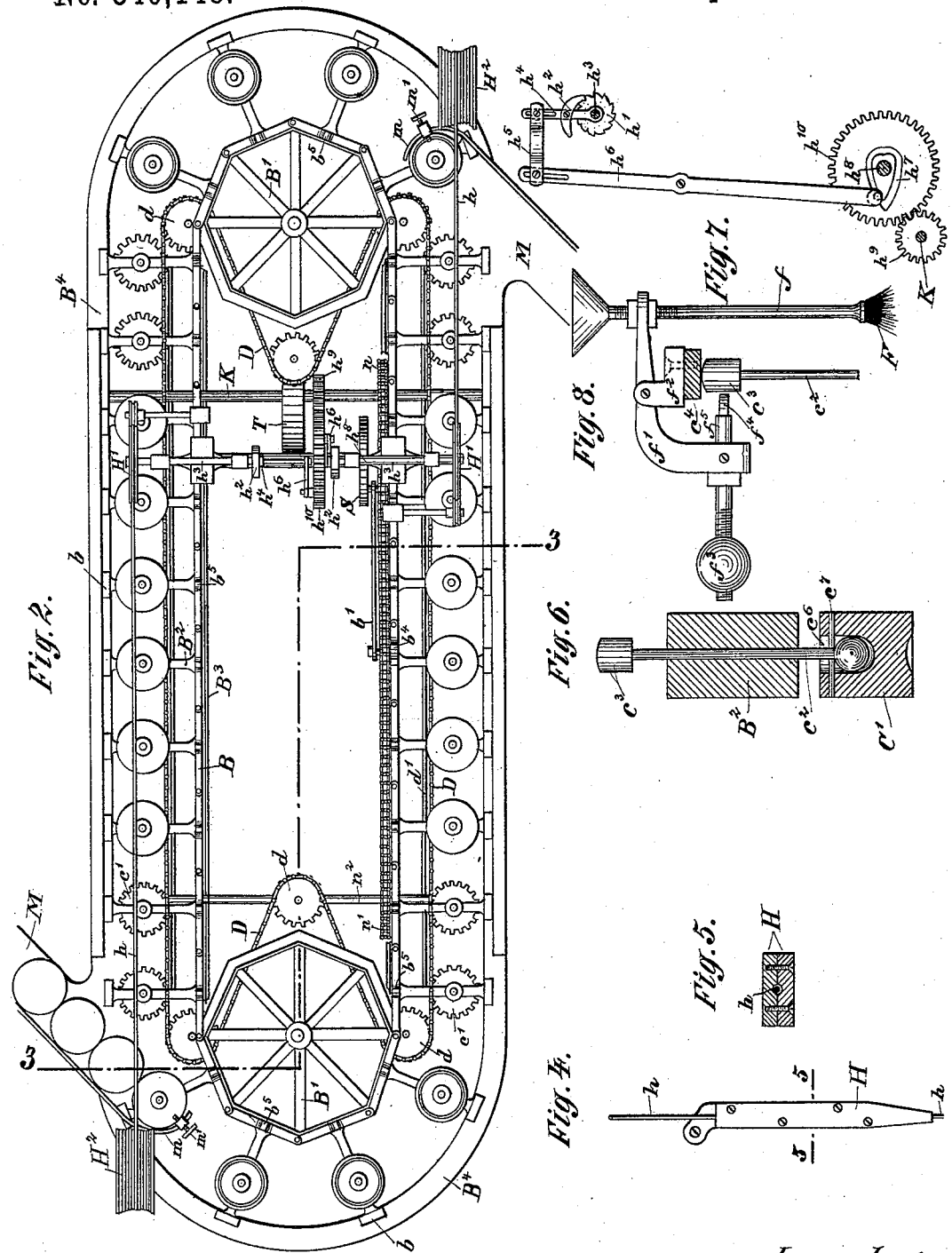

(No Model.)  3 Sheets—Sheet 3.
E. NORTON & J. G. HODGSON.
MACHINE FOR SOLDERING CAPS UPON SHEET METAL CANS.
No. 340,148.  Patented Apr. 20, 1886.
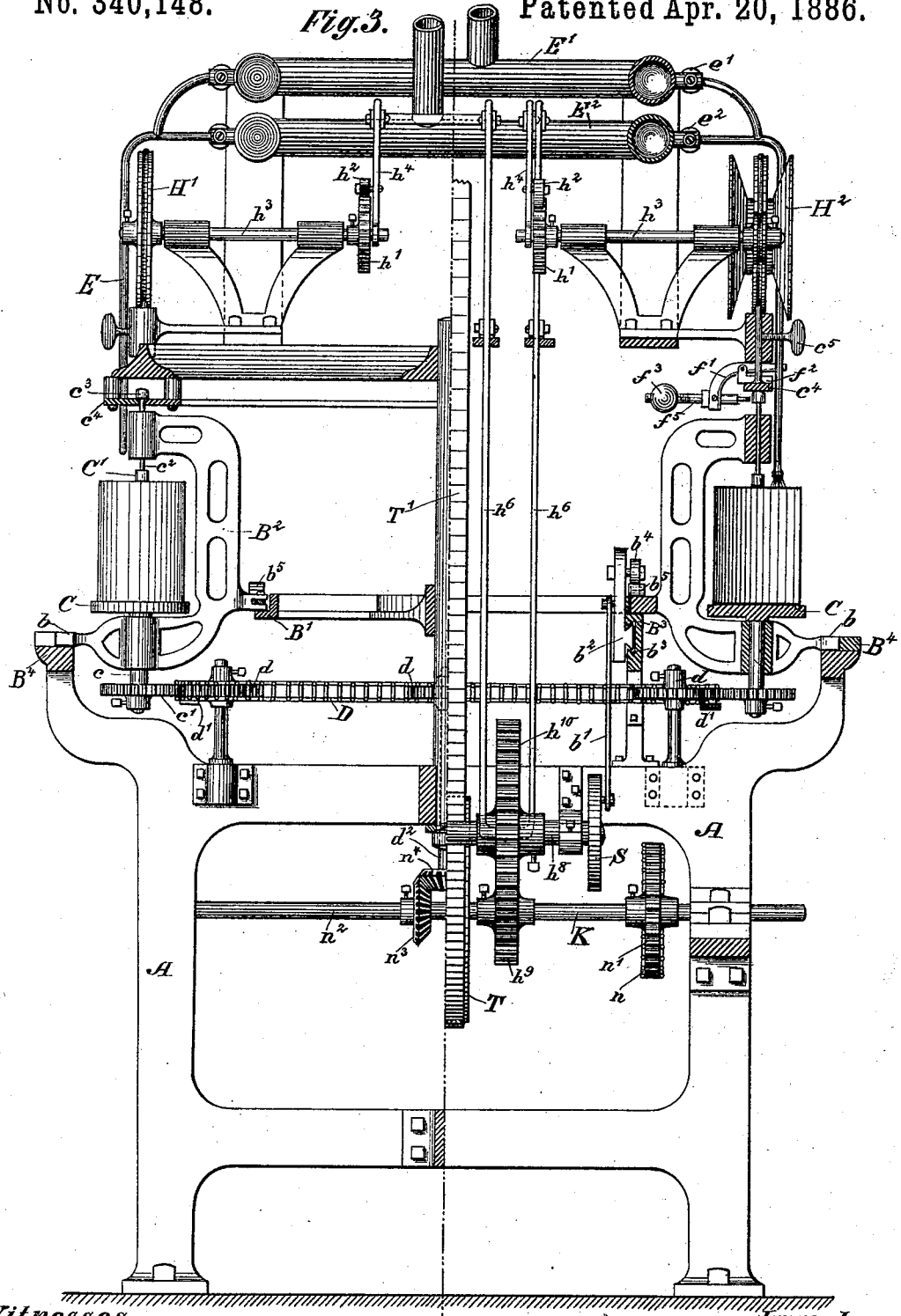

United States Patent Office.

EDWIN NORTON AND JOHN G. HODGSON, OF CHICAGO, ILLINOIS, ASSIGNORS TO SAID EDWIN NORTON AND OLIVER W. NORTON, OF SAME PLACE.

MACHINE FOR SOLDERING CAPS UPON SHEET-METAL CANS.

SPECIFICATION forming part of Letters Patent No. 340,148, dated April 20, 1886.

Application filed August 1, 1885. Serial No. 173,212. (No model.)

*To all whom it may concern:*

Be it known that we, EDWIN NORTON and JOHN G. HODGSON, citizens of the United States, residing in Chicago, in the county of Cook and State of Illinois, have invented a new and useful Improvement in Machines for Soldering Caps Upon Sheet-Metal Cans, of which the following is a specification.

The object of the present invention is to provide an automatic machine for soldering caps upon filled cans; and to this end our invention consists, primarily, in a series of revoluble can-holder disks or chucks adapted to bear against the ends of the cans and to hold the caps in place, mounted upon an intermittently-moving flexible carrier, by which the cans are successively brought beneath a series of heaters, preferably gas-jets, to heat the joint, and an acid-brush or other fluxing device, a solder-applying device, preferably consisting of a solder feed-guide, as wire solder can be most conveniently used, and a water-brush, air or steam jet, or other cooling device, in connection with said heating, aciding, soldering, and cooling devices arranged in the path of said carrier. One of the revoluble heads or disks of the can-holder, preferably the upper one, which presses against the cap of the can, is made slightly movable up and down, and is operated to automatically release and clamp the can as the carrier moves along, by means of a stationary cam, track, or guide. The shaft or spindle of one of the revoluble disks, preferably the lower or non-reciprocating one, is provided with a gear, the teeth of which mesh with the links or projections of an endless chain, so as to revolve the moving can-holders in their various positions as they advance with the carrier from one gas-jet to another, from the acid-applying device to the solder-applying device, and from the latter to the cooling device.

The movable carrier upon which the can-holders are mounted is best made in the form of an endless sprocket-wheel chain, and herein another feature of our invention consists, in which case the frame or bearings in which the spindles of the can-holder disks are journaled may preferably be cast integral with the links of the chain. This link-chain carrier travels upon suitable ways or tracks to support the same firmly and to maintain the cans in a vertical position while being operated upon. By means of a number or series of gas-jets, under each of which the can is brought in succession, we are enabled to heat each can or joint slowly and properly, so as not to injure it or its contents, and at the same time heat and solder the cans with great rapidity, as all the gas-jets are operating upon different cans at the same time. It adds greatly to the capacity of our machine, also, that while one can is being heated the acid is applied to another, the solder to another, and still another is being cooled.

Each side of the machine is a duplicate of the other, so that two sets of cans may be operated upon at once, and each side of the machine is independently adjustable of the other, so that cans of one size may be operated upon by one side of the machine, while at the same time cans of a different size may be operated upon by the other side of the machine.

In the accompanying drawings, which form a part of this specification, and in which similar letters of reference indicate like parts, Figure 1 is a side elevation of a machine embodying our invention. Fig. 2 is a plan view, the gas and air supply pipes being omitted. Fig. 3 is an enlarged cross-section taken on lines 3 3 of Fig. 2, the right half of the section being taken near the middle and the left half near one end of the machine. Fig. 4 is an enlarged detail of the wire-solder feed-guide. Fig. 5 is a cross-section on line 5 5 of Fig. 4. Fig. 6 is an enlarged central vertical section of the upper or movable clamp or disk of the can-holder which presses against the can-cap. Fig. 7 is a detail view of the mechanism for operating the wire-solder feed-wheel, and Fig. 8 is an enlarged detail view of the mechanism for operating the acid-brush or the water-brush.

In said drawings, A represents the frame of the machine; B, the movably carrier, consisting, preferably, of an endless link-chain; B' B', the sprocket or polygon wheels by which it is carried, and $B^2$ the supporting frames or bearings for the spindles of the can-holder disks, preferably cast integral with the links of the chain; and $B^3$ $B^4$ are the tracks or guideways upon which the chain carrier travels and is supported. The can-holder frames $B^2$ are provided with projections $b$, which rest upon the outer endless track, $B^4$. The longitudinal links of the chain ride upon the inner endless track, $B^3$. The polygon wheels $B'$ $B'$, which support the chain carrier B, take the place of the inner track, $B^3$, at each end.

C is the lower or non-reciprocating can-holder disk. The upper surface of the disk is recessed in the usual manner to fit the can-head, as indicated in section in Fig. 3. The spindle $c$ of this disk is journaled in the can-holder frame $B^2$ and projects through said frame. Near its lower end the spindle $c$ is furnished with a spur-gear, $c'$, which meshes with an endless link or sprocket-wheel chain, D, by means of which the can-holder disks are revolved. The chain D is carried upon a series of sprocket or toothed wheels, $d$, and a track or guideway, $d'$, which serves to keep the chain in constant engagement with the toothed wheels $c'$ as the can-holders are carried along by the carrier B. This chain D serves to revolve the can-holders while the cans are presented to the gas-jets or heaters, aciding device, soldering device, and cooling device. At each end of the machine, where the soldered cans are removed from the machine and cans to be soldered placed in the can-holders, this chain is deflected from the path of the can-holders, so that the can-holders will not be revolved while the cans are being placed in and taken out.

The spindle $c^2$ of the upper disk or head, $C'$, of the can-holder, which moves or reciprocates slightly up and down to clamp and to release the cans, and to hold the caps firmly in place while being soldered and operated upon, is also journaled in the can-holder frame $B^2$. It is provided near its upper end with a head or enlargement, $c^3$, which engages an adjustable stationary cam or track, $c^4$, preferably a grooved cam, so that the head or enlargement $c^3$ will have a bearing on the track on each side of the spindle. The elevated portion of the track or cam $c^4$ is located at each end of the machine, where the cans are taken out and placed in the machine, and it serves to raise the cap-clamping disk or head $C'$ when the can holder is carried around into this position by the movable carrier B. The cam or track $c^4$ at the middle portion of the machine serves to press the head $C'$ down firmly on the cap which is to be soldered, and to clamp the can firmly between the two disks or revolving holders C $C'$. This middle portion of the cam or track $c^4$, it will be observed from Fig. 1 of the drawings, is adapted to press against the end of the spindle or its head $c^3$, while the end portions of the cam which lift the disks $C'$ bear against the lower shoulder of the heads or projections $c^3$. The middle portion of the cam or track $c^4$ need not therefore be grooved or divided. This is shown clearly in Fig. 3.

The cam or track $c^4$, by which the clamping disks or head $C'$ are automatically operated up or down, is adjustably attached to the frame of the machine by means of the set-screws, $c^5$, so that the machine may be readily adjusted or adapted to operate upon cans of different lengths.

E represents a series of heating devices, preferably gas-jets, in the path of the cans as they move forward on the carrier, whereby the joint to be soldered is heated. These gas-jets are located the same distance apart as the can-holders upon the carrier, so that a number of cans may be heated or partially heated at the same time.

The apparatus shown in the drawings is specially designed for using gasoline, and $E'$ represents the gas-supply pipe, and $E^2$ an air-supply pipe. The burners or gas-jet tubes E connect with both, and cocks $e$ $e'$ are provided for regulating the supply of gas and air to the burners. The number of burners E may of course be varied. As shown in the drawings, seven are employed on each side of the machine, and this we consider the preferable number.

The aciding or fluxing device may preferably consist of a non-revolving brush, F, of asbestus or other suitable material, to which acid is supplied by a pipe, $f$, from an acid tank or vessel, $F'$. The acid-brush F or its supply-pipe $f$ is mounted upon the end of a lever, $f'$, pivoted to a bracket, $f^2$, secured to the track $c^4$. This lever carries an adjustable weight, $f^3$, on its outer end, by means of which the acid-brush is elevated out of the way of the moving cans, so that the head of the can will not be smeared with acid as it advances into position. As each can moves into position, the round head $c^3$ comes in contact with the rounded end $f^4$ of an adjustable projection, $f^5$, on the lever $f'$, and thus depresses the acid-brush until it comes in contact with the joint. The same mechanism is employed to raise and depress the water-brush L, to cool the can after it is soldered. It should be observed, however, that the water brush or sponge is so adjusted as not to come in contact with the solder, but presses against the head of the can just outside the soldered joint, so as not to disturb or injure the same.

One of the burners E is preferably located before the aciding device, so that the joint will be partially heated before the acid is applied. As the carrier B moves intermittently forward, each can in turn is presented to and revolved in contact with the acid-brush.

H is a stationary wire solder guide, through which the wire solder $h$ is fed intermittently to the joint as each can in turn is presented to and revolved beneath the same.

$H'$ is the wire-solder feed wheel or device and $H^2$ is a spool or reel from which the wire solder is supplied.

The feed-wheel $H'$ is operated to feed the wire solder intermittently the requisite lengths for each can as it is presented by means of a ratchet, $h'$, on the shaft of said feed-wheel, a pawl, $h^2$, lever $h^4$, connecting-link $h^5$, and pivoted lever $h^6$, which is operated by the grooved cam $h^7$ on the shaft $h^8$. The shaft $h^8$ is driven from the main driving-shaft K by a spur-gear, $h^9$, thereon, which meshes with a spur-gear, $h^{10}$, on said cam-shaft $h^8$.

As the machine may be desired and is adapted to operate upon cans of different sizes on each of its duplicate sides, the mechanism for operating the wire-solder feed-wheels is duplicated on each side of the machine, so that the feed of solder may be differently adjusted to suit cans of different sizes.

L represents a brush, sponge, or jet by which water, air, or steam may be applied to the soldered can to cool the same. The water may be supplied from a tank or reservoir, as L'. To cool the cans, jets of air or steam may also be applied thereto through the air-pipe $l$.

As shown in the drawings, the two air-pipes $l$ appear similar to the gas-burner pipes E; but it will of course be understood that the cocks connecting the air-tubes $l$ with the gas-reservoir E' are kept closed.

The wire solder is melted by contact with the heated joint. For the better distribution of the solder we prefer to arrange one burner to act upon the can after the solder has been applied to the joint, as indicated in Fig. 1.

The cans are automatically delivered from the machine into a chute or other suitable conveyer device, M, by means of a stationary curved shield, $m$, which projects across the pathway of the cans. To lift the edge or rim of the can out of the groove in the bottom disk, C, an adjustable projection, $m'$, is provided in the pathway of the cans, which, bearing or striking against the cans near their top, operates to slightly tilt the cans, as indicated in Fig. 1, before they come in contact with the delivery-shield. The head or disk C', which bears against the cap of the can, is connected to its spindle $c^2$ by a ball-and-socket joint, $c^6$, so that the disk C' will bear evenly upon the cap all around. This loose connection of the disk C' also aids the action of the delivery-shield. A pin, $c^7$, serves to retain the ball on the spindle $c^2$ in the socket $c^6$ of the disk C'.

Motion is communicated to the carrier B from the wheel S by means of a pitman-rod, $b'$, which operates a reciprocating slide, $b^2$, mounted in a dovetail groove, $b^3$, on the frame, which slide carries a pivoted pawl or pusher, $b^4$, that engages notches or projections $b^5$ on the links of the chain carrier B. Motion is communicated to the chain D, which operates to revolve the can-holders from the main driving-shaft by means of a sprocket-wheel or gear, N, thereon, chain $n$, wheel $n'$ on shaft $n^2$, and bevel-gear $n^3$ on said shaft, which meshes with a bevel-gear, $n^4$, on the shaft $d^2$ of one of the sprocket-wheels $d$, which carry said chain D.

The wire-solder guide H is preferably made in two parts, as indicated in Figs. 4 and 5.

The cam-surface or rounded end $f^4$ of the projection $f^5$ should be sufficiently sharp or abrupt in connection with the round head $c^3$ to operate or depress the acid-brush F quickly, and not until the can is almost brought into position, so that the brush will only be brought in contact with the joint to be soldered of the revolving can.

While certain features of our invention consist in the particular construction of the various parts and devices and their combinations, as more particularly pointed out in some of the claims, our invention in its broader aspect is, however, not confined to any particular kind or construction of movable carrier, heaters, acid applying or fluxing device, solder-applying device, or cooling device.

We hereby disclaim the device shown and described in Letters Patent No. 234,950, of November 30, 1880, to Brooks. In said patent the wire solder is cut into short lengths by a pair of shears, and then the short pieces of solder feed down by their own gravity through the feed-guide against the joint. In our invention we dispense with the shears entirely, and the wire-solder-feed mechanism operates to force the wire solder in stated lengths positively against the heated joint as it revolves, so that the solder is positively and evenly distributed over the whole joint.

We claim—

1. In a can-cap-soldering machine, the combination, with a series of stationary burners for heating the cans, of an acid-brush, a wire-solder feed-guide, a tube for applying water to cool the cans, an intermittently-moving carrier, and a series of revolving can-holders mounted thereon, substantially as specified.

2. In a can-cap-soldering machine, the combination of an intermittently-moving carrier, a series of revolving can-holders mounted thereon, a series of stationary burners or heaters arranged in the path of said carrier, and a solder-applying device, substantially as specified.

3. In a can-soldering machine, the combination of an intermittently-moving carrier, a series of revolving can-holders mounted thereon, a series of stationary burners or heaters arranged in the path of said carrier, an acid-applying device, and a solder-applying device, substantially as specified.

4. The combination, in a can-cap-soldering machine, of an intermittently-moving carrier, a series of revolving can-holders mounted thereon, each consisting of an upper and lower revolving disk or head and a stationary cam or track having a depressed portion, to operate the can-holder disk to clamp the can and hold the cap until it is soldered, and a raised portion to withdraw the cap-holder disk from the can and hold the same withdrawn, to permit the cans to be removed from and placed in the machine, substantially as specified.

5. The combination, in a can-cap-soldering machine, of an intermittently-moving carrier, a series of revolving can-holders mounted thereon, each consisting of an upper and lower revolving disk or head and a stationary cam or track having a depressed portion, to operate the can-holder disks to clamp the can and hold the cap until it is soldered, and a raised portion to withdraw the cap-holder disk from the can and hold it so withdrawn, to permit the cans being placed in and taken out of the machine, an aciding device, and a solder-applying device, substantially as specified.

6. The combination in a can-cap-soldering machine, of an intermittently-moving carrier, a series of revolving can-holders mounted thereon, each consisting of an upper and lower revolving disk or head and a stationary cam or track having a depressed portion, to operate the can-holder disk to clamp the can and hold the cap until it is soldered, and a raised portion to withdraw the cap-holder disk from the can and hold it so withdrawn, to permit the cans being removed from and placed in the machine, a device for heating the cans, and a solder-applying device, substantially as specified.

7. The combination, in a can-cap-soldering machine, of an intermittently-moving carrier, a series of revolving can-holders mounted thereon, each consisting of an upper and lower revolving disk or head, a stationary cam or track having a depressed portion to operate the can-holder disks to clamp the can and hold the cap until it is soldered, and a raised portion to withdraw the cap-holder disk from the can and hold it so withdrawn, to permit the cans to be placed in and removed from the machine, a device for heating the cans or joints, an aciding device, a solder-applying device, and a cooling device, substantially as specified.

8. The combination of a pivoted link or chain carrier, B, provided with can-holder frames $B^2$, with a track or guideway for said chain carrier, can-holding disks C C', journaled on said holder-frames $B^2$, gears or wheels $c'$ on the spindles, and an endless chain, D, for revolving said can-holder disks, substantially as specified.

9. The combination of a pivoted link or chain carrier, B, provided with can-holder frames $B^2$, with a track or guideway for said chain carrier, can-holding disks C C', journaled on said holder-frame $B^2$, gears or wheels $c'$ on the spindles, and an endless chain, D, for revolving said can-holder disks, and a track or guideway for said chain D, substantially as specified.

10. The combination of a pivoted link or chain carrier, B, provided with can-holder frames $B^2$, with a track or guideway for said chain carrier, can-holding disks C C', journaled on said holder-frames $B^2$, gears or wheels $c'$ on the spindles, and an endless chain, D, for revolving said can-holder disks C, and a stationary cam or track for raising and lowering said can-holder disks C to clamp and release the cans, substantially as specified.

11. The combination of a pivoted link or chain carrier, B, provided with can-holder frames $B^2$, with a track or guideway for said chain carrier, can-holding disks C C', journaled on said holder-frames $B^2$, gears or wheels $c'$ on the spindles, and an endless chain, D, for revolving said can-holder disks, a series of burners or heaters, E, and a solder-applying device, substantially as specified.

12. The combination, with an intermittently-moving carrier provided with a series of revolving can-holders mounted thereon, of an acid-applying brush mounted in the path of the cans on said carrier, and mechanism for depressing said brush against the joint of the can when the same is brought into position by the carrier, substantially as specified.

13. The combination, with a moving carrier having a series of can-holders mounted thereon, of an acid-applying brush or device, a pivoted lever on which the same is mounted, provided with a cam or projection for depressing said brush, and a projection or device on the can-holders for operating said cam-lever, substantially as specified.

14. The combination, with a moving carrier having a series of can-holders mounted thereon, of an acid-applying brush or device, a pivoted lever on which the same is mounted, having a weight for raising said brush, and provided with a cam or projection for depressing said brush, and a projection or device on the can-holders for operating said cam-lever, substantially as specified.

15. The combination of an intermittently-moving carrier, B, provided with a series of revolving can-holders consisting each of a pair of disks, C C', mounted in a frame, $B^2$, said disk C' having a spindle, $c^2$, provided with a head or projection, $c^3$, acid-brush F, pipe $f$, lever $f'$, weight $f^3$, and cam projection $f^4$, substantially as specified.

16. The combination, in a can-cap-soldering machine, of an intermittently-moving carrier provided with a series of can-holders, of a cooling device consisting of a movable water-brush and mechanism for depressing the same against the head of the can when the can is brought beneath the same by the carrier, substantially as specified.

17. The combination of a pivoted link or chain carrier, B, provided with can-holder frames $B^2$, with a track or guideway for said chain carrier, can-holding disks C C', journaled on said holder-frames $B^2$, gears or wheels $c'$ on the spindles, and an endless chain, D, for revolving said can-holder disks, a series of burners or heaters, E, an acid-applying device, and a solder-applying device, substantially as specified.

18. The combination of a pivoted link or chain carrier, B, provided with can-holder frames $B^2$, with a track or guideway for said chain carrier, can-holding disks C C', journaled on said holder-frames $B^2$, gears or wheels $c'$ on the spindles, and an endless chain, D, for revolving said can-holder disks, a series of burners or heaters, E, an acid-applying device, and a solder-applying device, and a cooling device, substantially as specified.

19. The combination of a pivoted link or chain carrier, B, provided with can-holder frames B², tracks B³ B⁴ for said carrier, a series of revolving can-holders mounted on said carrier, each consisting of an upper and a lower revolving disk, and a stationary cam or track, c⁴, to operate the upper disks to clamp and release the cans, substantially as specified.

20. The combination, in a can-cap-soldering machine, of an intermittently-moving carrier provided with a series of revolving can-holders, with a wire-solder guide arranged in the path of said carrier, a heating device adapted and arranged to heat the joint to be soldered without directly acting upon the wire solder or its feed-guide, and a wire-solder-feeding device constructed, adapted, and arranged to feed and force the wire solder in definite lengths against the heated joint, whereby the same is melted as it is fed or forced against the joint, substantially as specified.

21. The combination, with a movable carrier provided with can-holders consisting each of a pair of revoluble disks, C C', a stationary cam or track for raising and lowering said disk C', and a stationary delivery-shield, m, arranged in the path of the cans, substantially as specified.

22. The combination, with a movable carrier provided with can-holders consisting each of a pair of revoluble disks, C C', a cam or track for raising and lowering said disk C', and a stationary delivery-shield, m, arranged in the path of the cans, and a projecting stop, m', to tilt or raise the rim of the can out of the centering recess or groove in said disk C' before the can comes in contact with said delivery-shield, substantially as specified.

23. The combination, with a movable carrier, B, provided with revoluble can-holders C C', of an adjustable cam or track, c⁴, to operate said can-holders to clamp and release the cans, whereby the machine may be adapted to cans of different sizes, substantially as specified.

24. The combination, with movable pivoted link or chain carrier B, provided with a series of revoluble can-holders, of supporting-trucks B³ B⁴, reciprocating slide b², provided with a pawl or pusher, as b⁴, projections, as b⁵, on said carrier B, and means for reciprocating said slide, substantially as specified.

25. The combination, with movable pivoted link or chain carrier B, tracks B³ B⁴ therefor, mechanism for driving said carrier intermittently, a series of can-holder frames, B², mounted on said carrier, can-holder disks C C', spindles c of disk C, provided with gears c', chain D, guideway d therefor, cam or track c⁴, burners E, acid ing device F, wire-solder guide H, and cooling device K, substantially as specified.

26. In a soldering-machine, the combination of an endless link-chain carrier, furnished with revolving can-holder disks at intervals, with wheels upon and around which said carrier travels, substantially as specified.

27. In a soldering-machine, the combination of an endless link-chain carrier, furnished with revolving can-holders at intervals, with wheels upon and around which said carrier travels, and a track or guide to support said carrier, substantially as specified.

28. In a soldering-machine, the combination of an endless flexible carrier, wheels upon and around which said carrier travels, and revoluble can-holder disks mounted on said endless carrier, substantially as specified.

29. In a soldering-machine, the combination of an endless flexible carrier, wheels upon and around which said carrier travels, and revoluble can-holder disks having spindles journaled on said endless carrier, said spindles being provided with gears for revolving the same, substantially as specified.

30. In a soldering-machine, an endless flexible carrier furnished with a series of revoluble can-holders, in combination with wheels upon and around which said carrier travels, and means for moving said carrier, substantially as specified.

31. In a soldering-machine, the combination of an endless flexible carrier, wheels upon and around which said carrier travels, can-holder disks having spindles journaled on said carrier, gears on said spindles, and means for driving said gears, substantially as specified.

32. The combination, with a solder-applying device, of an endless flexible carrier, B, wheels B' B', and revolving can-holder disks C C', means for reciprocating one of said disks to clamp and release the can, and mechanism for revolving said can-holders mounted on said carrier, substantially as specified.

33. In a soldering-machine, the combination, with an endless flexible carrier, of wheels upon and around which said carrier travels, can-holder disks mounted on said carrier, and heating devices for heating the cans as they are carried around on said carrier, substantially as specified.

34. The combination, with an endless flexible carrier, of wheels upon and around which said carrier travels, can-holders mounted on said carrier, a track to support the carrier, and a solder-applying device, substantially as specified.

35. The combination of a revolving can-holder or chuck with a wire-solder feed-guide, a device for heating the joint to be soldered, and a wire-solder feeding device constructed, adapted, and arranged to feed and force the wire solder in definite lengths against the heated joint, whereby said solder is melted as it is forced against the joint, substantially as specified.

36. The combination, with a revolving can-holder or chuck, a wire-solder feed-guide, a device for heating the joint to be soldered, a wire-solder feed-wheel, and means for adjusting or regulating the extent of feed, said heating device, feed-guide, and feed mechanism being adapted and arranged to feed or project the wire solder against the heated joint to melt the solder, substantially as specified.

37. The combination, with a wire-solder feed-guide, of a device for heating the joint to be soldered and a wire-solder feeding device constructed, adapted, and arranged to feed and force the wire solder in definite lengths against the heated joint, whereby the same is melted as it is fed, said heating device being adapted and arranged to heat the joint to be soldered without directly acting upon the wire solder or its feed-guide, substantially as specified.

38. In a soldering-machine, an endless link-chain carrier, as B, furnished with can-holder frames, as $B^2$, and can-holder disks, as C and C', having spindles journaled on said frames, substantially as specified.

EDWIN NORTON.
JOHN G. HODGSON.

Witnesses:
H. M. MUNDAY,
EDMUND ADCOCK.